United States Patent

Van Der Zaag et al.

[11] Patent Number: 6,057,649
[45] Date of Patent: May 2, 2000

[54] ILLUMINATION UNIT, ELECTRODELESS LOW-PRESSURE DISCHARGE LAMP, AND COIL SUITABLE FOR USE THEREIN

[75] Inventors: Pieter J. Van Der Zaag; Klaas Vegter; Petrus H. Antonis, all of Eindhoven; Pieter J. Van Der Valk, Azuqueca de Henanes, all of Netherlands

[73] Assignee: U.S. Philips Corporation, New York, N.Y.

[21] Appl. No.: 08/239,010

[22] Filed: May 5, 1994

[30] Foreign Application Priority Data

| May 11, 1993 | [BE] | Belgium | 09300483 |
| Oct. 4, 1993 | [EP] | European Pat. Off. | 93202819 |
| Jan. 24, 1994 | [EP] | European Pat. Off. | 94200153 |
| Jan. 24, 1994 | [EP] | European Pat. Off. | 94200161 |

[51] Int. Cl.[7] .......................... H01F 27/255; H05B 41/24
[52] U.S. Cl. ............... 315/248; 315/57; 315/62; 315/344; 315/348; 252/62.56; 313/484
[58] Field of Search ............... 252/62.56; 315/348, 315/248, 344, 57, 62; 313/484

[56] References Cited

U.S. PATENT DOCUMENTS

| 3,521,120 | 7/1970 | Anderson | 313/201 |
| 4,372,865 | 2/1983 | Yu et al. | 252/62.62 |
| 4,710,678 | 12/1987 | Houkes et al. | 315/39 |
| 4,748,383 | 5/1988 | Houkes | 315/248 |
| 5,138,546 | 8/1992 | Johnson et al. | 363/131 |

FOREIGN PATENT DOCUMENTS

| 974853 | 11/1964 | United Kingdom | 252/62.56 |

*Primary Examiner*—Arnold Kinkead
*Attorney, Agent, or Firm*—Brian Wieghaus

[57] ABSTRACT

An illumination unit including an electrodeless low-pressure discharge lamp (20) and a supply device (50). The lamp has a discharge vessel (30) which encloses in a gastight manner a discharge space (31) which is provided with an ionizable filling. The lamp (20) further has a coil (40) provided with a winding (42) around a sintered core (41) of polycrystalline ferrite material, which winding (42) is connected to the supply device (50). The coil (40) is capable of inducing a high-frequency magnetic field which maintains a discharge in the discharge space (31). The losses in the core (41), when measured at room temperature in a magnetic field with a frequency of 3 MHz and a magnetic flux density of 10 mT, amount to at most 150 mW/cm$^3$. This has the advantage that the lamp (20) ignites comparatively quickly and loads the supply device (50) comparatively weakly during ignition. The supply device (50) as a result can have a comparatively long useful life.

25 Claims, 3 Drawing Sheets

ILLUMINATION UNIT, ELECTRODELESS LOW-PRESSURE DISCHARGE LAMP, AND COIL SUITABLE FOR USE THEREIN

BACKGROUND OF THE INVENTION

The invention relates to an illumination unit comprising an electrodeless low-pressure discharge lamp and a supply device, which lamp has a discharge vessel enclosing in a gastight manner a discharge space provided with an ionizable filling, and which lamp in addition has a coil provided with a winding around a sintered core of polycrystalline ferrite material, which winding is connected to the supply device, the coil being capable of inducing a high-frequency magnetic field which maintains a discharge in the discharge space.

The invention also relates to an electrodeless low-pressure discharge lamp and to a coil suitable for use in such an illumination unit.

An illumination unit of the kind described in the opening paragraph is known from U.S. Pat. No. 4,710,678. In a nominal operating condition, the high-frequency magnetic field caused by the coil generates an electric current in the discharge space which keeps the discharge going. The known illumination unit is ignited in that a resonant circuit, which includes the coil, is brought into resonance. A comparatively high voltage arises across the coil during this. This voltage is used to generate an electric field by means of one or several conductors adjacent the discharge vessel, for example the winding of the coil, thus initiating the discharge. The losses occurring in the illumination unit during nominal operation are mainly due to the thermal losses occurring in the discharge space, as are the losses in a conventional low-pressure discharge lamp in which the discharge is maintained by electrodes. These losses amount to approximately 60% of the power consumed by the illumination unit. Losses specific to the electrodeless lamp, i.e. the losses in the electric circuit and the losses in the coil, are found to be small compared therewith, approximately 11% and approximately 5%, respectively, of the power consumed. The efficacy of the electrodeless lamp, accordingly, is of the same order of magnitude as that of a conventional low-pressure discharge lamp. Such an illumination unit has the advantage that the lamp can have a comparatively long operational life, because electrodes in the discharge space are unnecessary.

It was found, however, that the life of the illumination unit can be limited by that of the supply device.

SUMMARY OF THE INVENTION

The invention has for its object to provide a measure in an illumination unit of the kind described in the opening paragraph which renders possible a longer life of the supply device.

According to the invention, the illumination unit is for this purpose characterized in that the losses in the core, when measured at room temperature in an alternating magnetic field with a frequency of 3 MHz and at a magnetic flux density of 10 mT, are at most 150 mW/cm$^3$.

The invention is based on the recognition that substantially all losses occur in the core of the coil during the ignition of the illumination unit. In fact, no substantial energy transfer to the discharge space takes place yet during ignition. Moreover, the losses occurring during ignition are comparatively high in relation to those during nominal operation because a comparatively high magnetic field strength prevails in the core during ignition. A substantially greater power is then derived from the supply device than during nominal operation. The core used in the illumination unit according to the invention, of which the losses under the said circumstances are below 150 mW/cm$^3$, loads the supply device to a considerably lesser extent. Since the resonant circuit in which the coil is included is subject to less damping as a result of the comparatively low losses, moreover, a higher ignition voltage is generated which causes the lamp to ignite more quickly. The supply device is thus loaded not only less heavily but also for a shorter time during ignition, so that it can have a longer useful life.

An attractive embodiment of the illumination unit according to the invention is characterized in that the sintered core is made of a ferrite material having a granular structure in which the major portion of the grains has a monodomain structure. The expression "the major portion of the grains" is understood to mean that at least 90% of the grains has a monodomain structure, i.e. has only one magnetic domain each. It was found that sintered cores of ferrite material of which most grains are monodomain, also referred to as monodomain ferrite material hereinafter, are subject to low overall losses. Losses occurring in the core can be reduced by 50% or more with these materials. An example of such a material is monodomain Mn—Zn ferrite. An exact explanation of this strong decrease in the losses is not yet available.

An advantageous embodiment is characterized in that the core is made of monodomain Ni—Zn ferrite material. The inventors have found that a core of this material shows surprisingly low losses, also for comparatively high frequency values, for example 10 MHz. Applicant has also experimentally established that the low losses are independent of the magnetic permeability ($\mu$) and—in the case of small grain dimensions—of the exact grain size.

A preferred embodiment of the invention is characterized in that the average grain size of the material described in the preceding paragraph is at most 2.8 $\mu$m. Applicant has established in a series of experiments that approximately 90% of the grains is of the monodomain variety at an average grain size of approximately 2.8 $\mu$m.

It is noted that U.S. Pat. No. 4,372,865 discloses a method of manufacturing products of a soft magnetic material, in particular of MnZn ferrite. A powder of spherical ferrite particles of 1–10 $\mu$m in size is manufactured thereby in a coprecipitation process. The object of this is to render possible a comparatively great spread in the temperature of a subsequent sintering process without adverse effects on the magnetic properties of the sintered end product. The patent specification does not make a pronouncement on the particle size of the sintered end product.

It was found by Applicant that the quantity of monodomain grains rises proportionally as the average grain size decreases. A quantity of substantially 100% of monodomain grains is achieved below an average grain size of approximately 2.6 $\mu$m. Owing to a loss mechanism which is as yet not understood, however, the overall losses rise again when the average grain size is chosen to be smaller than 1.1 $\mu$m, in spite of the fact that these small grains are monodomain. In the preferred range in which the average grain size is from 1.3 to 2.6 $\mu$m, the overall losses are substantially constant and substantially independent of grain size. The grain size of the sintered Ni—Zn cores was determined by the so-called "mean-linear-intercept" method.

It is noted that the material 4C6 with a composition defined by the formula $Ni_{0.64}Zn_{0.32}CO_{0.03}Fe_{2.01}O_4$ and with a grain size of 4.1 $\mu$m is used in the known illumination unit. Less than the major portion of the grains is monodomain in this material. The losses therein amount to approximately 320 mW/cm$^3$ at a frequency of 3 MHz and a magnetic flux density of 10 mT.

A further favourable embodiment of the illumination unit according to the invention is characterized in that the monodomain ferrite material comprises 42.8–55.9 mole % Fe$_2$O$_3$, 17.6–45.7 mole % NiO and 8.4–34.3 mole % ZnO. Cores having a composition within these limits exhibit a comparatively high spontaneous induction (B$_s$). This is favourable for such cores because in this case the losses are comparatively low compared with cores whose spontaneous induction is comparatively low. Moreover, these ferrites usually have a Curie temperature above 200° C. The comparatively high Curie temperature allows for comparatively wide tolerances in the design of the lamp.

It is noted that the ferrite material preferably comprises a comparatively small quantity of Co. The presence of this additive leads to a comparatively plane $\mu$-T curve, especially in the range of temperatures which occur in the core of the illumination unit during operation. A Co quantity above 1.5 at %, however, is detrimental. The said curve does not become planer thereby than it already is with a smaller quantity of the expensive Co. In addition, the ferrite material according to the invention may comprise small quantities of dopants. This refers in particular to sintering aids such as V$_2$O$_5$ and Bi$_2$O$_3$. Besides, for example, MnO, SiO$_2$ and CaO may be present. The maximum quantity of each of these dopants, however is always less than 2% by weight.

A further embodiment of the illumination unit according to the invention is characterized in that the monodomain ferrite material comprises 42.8–51.9 mole % Fe$_2$O$_3$, 19.2–45.7 mole % NiO and 9.6–34.3 mole % ZnO. Such a composition contributes, as does the use of Co, to a comparatively plane $\mu$-T curve in the said temperature range.

A favourable embodiment of the illumination unit according to the invention is also one which is characterized in that the average width of the non-magnetic grain boundary region in the monodomain Ni—Zn ferrite material is smaller than 4 nm. The expression "non-magnetic grain boundary region" is understood to mean the phase between the monodomain ferrite grains. The average width $\delta$ of the non-magnetic grain boundary region is defined as the ratio of the average grain size d to the initial permeability $\mu_i$ measured at the Curie temperature T$_c$ of the relevant ferrite material.

The last-mentioned embodiment is based on the observation that hysteresis losses in the sintered ferrite material with monodomain grains provide a major contribution to the overall losses, given the comparatively high magnetic flux densities occurring during ignition, when $\delta$ is chosen to be comparatively great. This contribution can be considerably reduced in that the said non-magnetic grain boundary region is made smaller than 4 nm. In that case, a smaller portion of the applied field is across the grain boundary during operation of the illumination unit. The result is that a greater portion of the applied field is available for varying the magnetization of the ferrite material with the desired waveform. The width of the grain boundary region is found to depend to a lesser or greater degree on the deviation from stoichiometry of the ferrite material. In the case of major deviations from stoichiometry, a greater portion of bivalent metal oxides (for example, NiO and/or ZnO) will deposit on the grain boundaries. This increases the $\delta$ value. Sintered ferrite materials which are substantially stoichiometrical have a $\delta$ value below 4 nm.

A yet further favourable embodiment of the illumination unit according to the invention is characterized in that the monodomain ferrite material comprises 42.8–50.0 mole % Fe$_2$O$_3$, 20.0–45.7 mole % NiO and 10.0–34.3 mole % ZnO. In contrast to the composition ranges mentioned earlier, the Ni—Zn ferrites described here all have a shortage of Fe. A shortage of Fe is favourable because the presence of Fe$^{2+}$ ions in the ferrite material is avoided thereby. The presence of such ions will lead to increased eddy current losses in the core.

BRIEF DESCRIPTION OF THE DRAWINGS

Embodiments of the invention are explained in more detail with reference to the examples and the drawings, in which.

DESCRIPTION OF THE PREFERRED EMBODIMENTS

Figure 1:
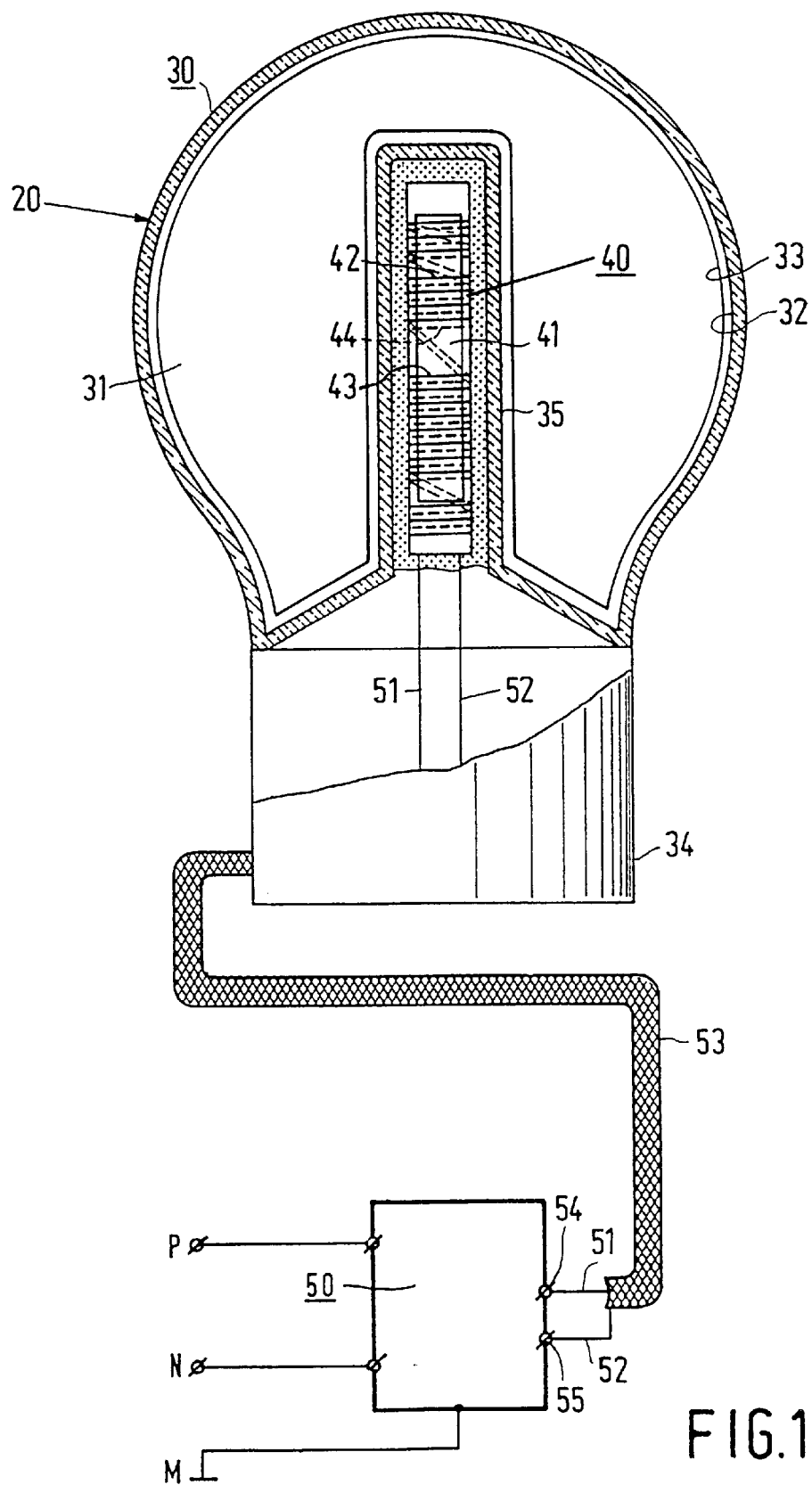
FIG. 1 shows an illumination unit comprising an electrodeless low-pressure discharge lamp according to the invention, partly in side elevation and partly in longitudinal section.

The illumination unit shown in FIG. 1 comprises an electrodeless low-pressure discharge lamp 20 and a supply device 50. The electrodeless low-pressure discharge lamp 20 has a discharge vessel 30 which encloses in a gastight manner a discharge space 31 which is provided with an ionizable filling. The discharge space 31 contains mercury and argon in this case. The discharge vessel 30 is provided with a layer 33 of luminescent material at an inner surface 32. In an alternative embodiment, such a layer is absent and the filling comprises sodium. The discharge vessel 30 is fastened to a synthetic-resin carrier 34. The lamp 20 further comprises a coil 40 formed by a sintered core 41 of polycrystalline ferrite which supports a winding 42. The losses in the core are at most 150 mW/cm$^3$ when measured at room temperature in a magnetic field with a frequency of 3 MHz and a magnetic flux density of 10 mT. The core is made, for example, from an Ni—Zn ferrite of which the major portion of the grains is monodomain, for example, Ni—Zn ferrite with a grain size of 3.0 $\mu$m. Under the said circumstances, the losses therein amount to 140 mW/cm$^3$. The core may be, for example, annular. In the embodiment shown, the core 41 has the shape of a hollow cylinder with a length of 50 mm and an inner and outer diameter of 8 and 12 mm, respectively. In the cavity inside the cylindrical core 41, a heat pipe is arranged which is thermally coupled to a metal disc accommodated in the carrier (not shown in FIG. 1). The coil 40 is present outside the discharge space 31 in a cavity 35 of the discharge vessel 30. Alternatively, the coil 40 may be arranged in the discharge space 31. A high-frequency magnetic field is induced by the coil 40 during operation, which keeps a discharge going.

The winding 42 of the coil 40 comprises 20 turns 43. The coil 40 further comprises a further winding 44 which also comprises 20 turns. The further winding 44 has the same winding direction as the winding 42 and lies against the winding 42 over its entire length. The winding 42 is connected at its ends to a first and a second output terminal 54, 55, respectively, of a supply device 50 via a first and a second current supply conductor 51, 52 which form a core and a sheath, respectively, of a coaxial cable 53 over part of their length. During nominal operation, the first output terminal 54 of the supply device 50 delivers a supply voltage with a frequency of approximately 3 MHz. The second output terminal 55 is free from high-frequency voltage variations. Such a supply device is known from U.S. Pat. No. 4,748,383. The supply device 50 is connected to poles P and N of the mains.

The further winding 44 is also connected with one end to the second current supply conductor 52. Said end lies opposite the end of the winding 42 which is connected to current supply conductor 52. The further winding 44 has another end which is free.

Figure 2:
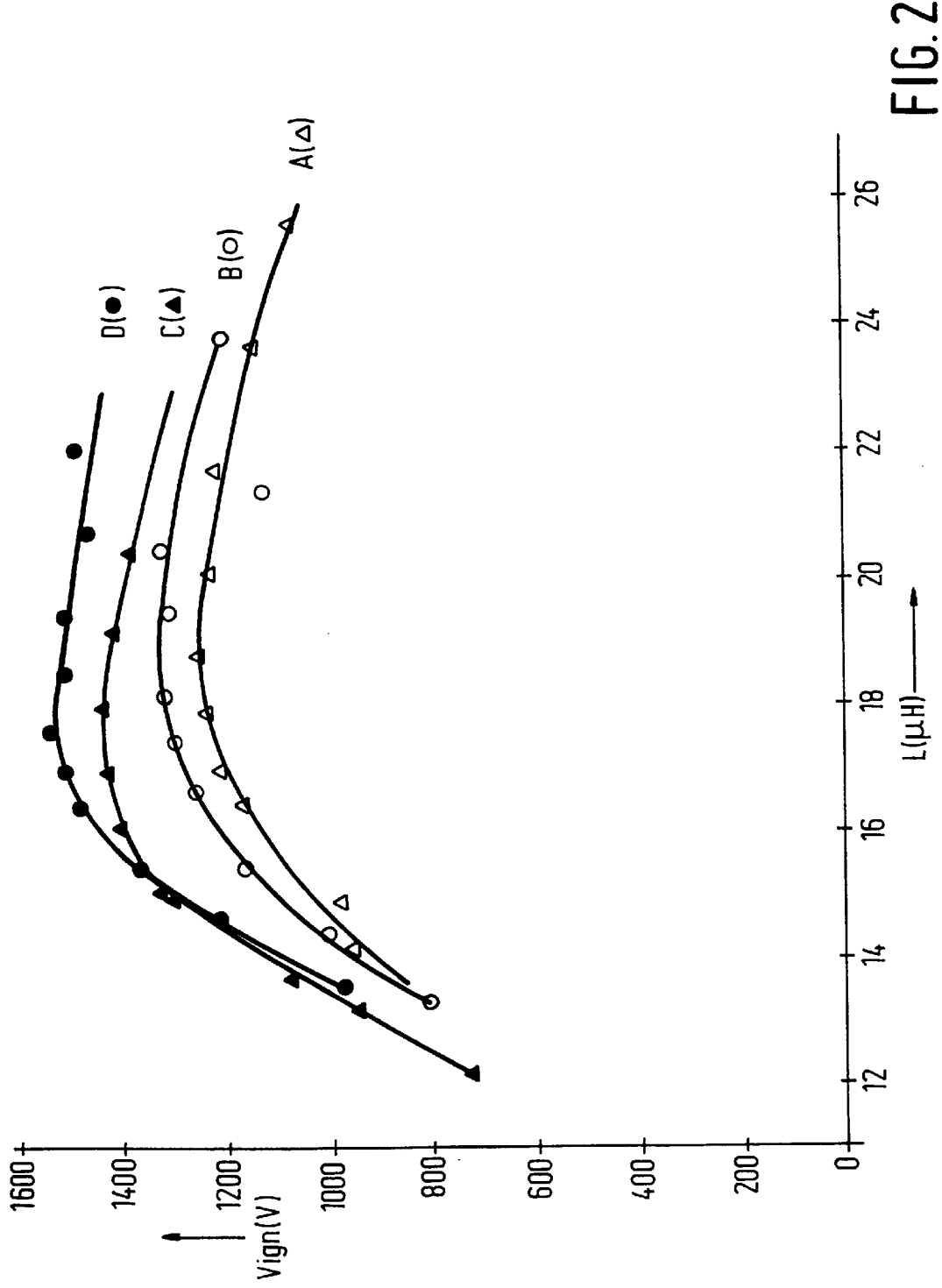
FIG. 2 shows the ignition voltage V$_{ign}$ (V) as a function of the self-induction H ($\mu$H) of the coil for various values of the grain size d ($\mu$m)

The ignition voltages were measured for lamps according to the invention and for lamps not according to the invention. For this purpose, cores were manufactured with average grain sizes of 6.8, 4.1, 3.0 and 2.8 μm. A series of 10 coils with different self-induction values was subsequently wound with each type of core. Depending on the interspacing between the turns, the self-induction measured at 3 MHz varied within each series from approximately 12 to approximately 26 μH. The composition of the core having a grain size of 4.1 μm is defined by the formula $Ni_{0.64}Zn_{0.32}Co_{0.03}Fe_{2.01}O_4$. The composition of the other cores was defined by the formula $Ni_{0.49}Zn_{0.49}Co_{0.02}Fe_{1.90}O_{3.85}$. In the graph shown in FIG. 2, the ignition voltage ($V_{ign}$) measured across the coils is given as a function of the self-induction (L). In this graph, curves A, B, C and D represent the established relationship for cores having grain sizes of 6.8, 4.1, 3.0 and 2.8 μm, respectively. The losses occurring in these cores in a magnetic field with a frequency of 3 MHz and a magnetic flux density of 10 mT are, in that order, 910, 320, 140 and 100 mW/cm³. The maximum ignition voltages which were reached for the said cores were 1250, 1325, 1437 and 1537 V, respectively. The maximum ignition voltage reached in a lamp according to the invention (C, D), in which the core losses are below 150 mW/cm³, is comparatively high in relation to that of lamps not according to the invention (A, B). A very favourable lamp is found to be lamp D, in which a core of 90% monodomain ferrite material is used.

Experiments have further shown that a reduction in the value of the non-magnetic grain boundary region δ by a factor 2 leads to a further increase in the ignition voltage by 90 V.

Figure 3:
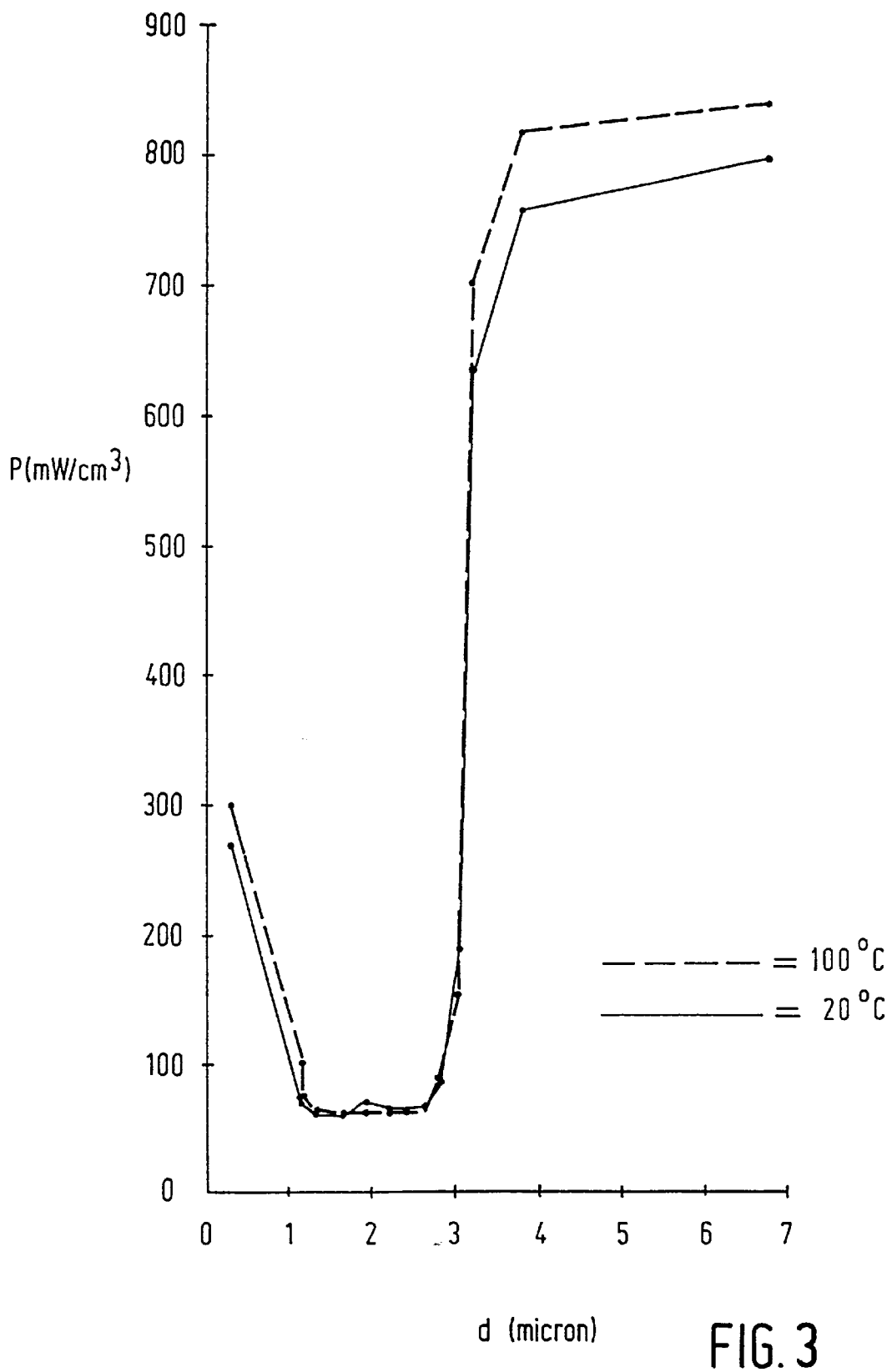
FIG. 3 is a graph of the losses per unit volume P (mW/cm$^3$) as a function of the grain size d ($\mu$m) for a number of sintered cores.

The losses were measured at a frequency of 3 MHz and a magnetic flux density of 10 mT of cores made of sintered Ni—Zn ferrite with a composition defined by the formula $Ni_{0.49}Zn_{0.49}Co_{0.02}Fe_{1.90}O_{3.85}$. FIG. 3 is a graph in which the overall losses per unit volume P of the sintered cores of the above composition are plotted as a function of the average grain size ("mean-linear-intercept" values). The sintered cores were manufactured starting from a powder of Ni—Zn ferrite. This powder was manufactured by standard ceramic techniques. Oxides and/or carbonates of the metals were mixed in a ratio corresponding to the envisaged composition, pre-fired and ground in the wet state. The mixture thus obtained was either dried and granulated or sprayed dry and subsequently compacted into the envisaged shape and sintered in air. Through variation of the sintering temperature (1000° C.–1300° C.) and the sintering time, a number of the sintered cores described above were thus manufactured with different grain sizes. The material of the sintered core with an average grain size of 0.3 μm was manufactured by means of hot isostatic moulding. The measurement was carried out at 20° C. and at 100° C. at a frequency of 3 MHz and a magnetic flux density of 10 mT. The Figure clearly shows that the overall losses for a grain size between 1.1 and 2.8 μm are below 100 mW/cm³. The lowest overall losses, however, are found at an average grain size between 1.3 and 2.6 μm. These losses are no more than approximately 60 to 70 mW/cm³. It could be ascertained by means of neutron depolarization measurements of these cores that substantially 100% of the grains of the cores having an average grain size below 2.6 1 μm have a monodomain structure.

The Table below lists the overall losses per unit volume P (mW/cm³) for a number of sintered cores of Ni—Zn ferrite suitable for the illumination unit according to the invention (examples a to d) compared with a number of sintered cores (examples A to D) not suitable for the illumination unit according to the invention. The overall losses per unit volume (P) were determined for the cores under three different circumstances: P1 (3 MHz and 10 mT), P2 (5 MHz and 7.5 mT) and P3 (10 MHz and 5 mT). It is apparent from this Table that the sintered cores of Ni—Zn ferrite show surprisingly low losses also for comparatively high frequency values, for example, 10 MHz.

| Example | d | P1 | P2 | P3 |
| --- | --- | --- | --- | --- |
| a | 6.8 | 797 | 1000 | 1350 |
| b | 3.8 | 759 | 978 | 1385 |
| c | 3.3 | 633 | 800 | 1244 |
| d | 3.1 | 190 | 240 | 150 |
| 1 | 2.6 | 82 | 78 | 91 |
| 2 | 2.4 | 66 | 64 | 59 |
| 3 | 2.2 | 67 | 66 | 59 |
| 4 | 1.7 | 58 | 56 | 51 |
| 5 | 1.1 | 75 | 74 | 66 |

We claim:

1. An illumination unit, comprising:

an electrodeless low-pressure discharge lamp; and a supply device, said lamp comprising a discharge vessel enclosing a discharge space in a gastight manner, an ionizable filling within said discharge space, and a coil for inducing a high-frequency magnetic field which maintains a discharge in the discharge space, said coil including a sintered core of polycrystalline ferrite material and a winding connected to the supply device, the ferrite material having a granular structure in which the major portion of the grains has a monodomain structure, the supply device including means for energizing said coil for inducing a high-frequency magnetic field which starts and maintains a discharge in the discharge space, characterized in that the losses in the core, when measured at room temperature in an alternating magnetic field with a frequency of MHz and at a magnetic flux density of 10 mT, are at most 150 mW/cm³.

2. An illumination unit as claimed in claim 1, characterized in that the core comprises Ni—Zn ferrite material.

3. An illumination unit as claimed in claim 2, characterized in that the average grain size of the ferrite material is at most 2.8 μm.

4. An illumination unit as claimed in claim 3, characterized in that the average gain size of the ferrite material lies between 1.3 and 2.6 μm.

5. An illumination unit as claimed in claim 4, characterized in that the ferrite material of the core comprises 42.8–55.9 mole % $Fe_2O_3$, 17.6–45.7 mole % NiO and 8.4–34.3 mole % ZnO.

6. An illumination unit as claimed in claim 5, characterized in that the ferrite material of the core comprises 42.8–51.9 mole % $Fe_2O_3$, 19.2–45.7 mole % NiO and 9.6–34.3 mole % ZnO.

7. An illumination unit as claimed in any one of the claim 6, characterized in that the average width of the non-magnetic grain boundary region in the ferrite material is smaller than 4 nm.

8. An illumination unit as claimed in claim 7, characterized in that the ferrite material of the core comprises 42.8–50.0 mole % $Fe_2O_3$, 20.0–45.7 mole % NiO and 10.0–34.3 mole % ZnO.

9. An electrodeless low-pressure discharge lamp, comprising: a discharge vessel enclosing a discharge space in a gastight manner, an ionizable filling in said discharge space, and a coil for inducing a high-frequency magnetic field which maintains a discharge in the discharge space, said coil including a sintered core of polycrystalline ferrite material and a winding around said core, the ferrite material having a granular structure in which the major portion of the grains has a monodomain structure, and wherein the losses in the core, when measured at room temperature in an alternating magnetic field with a frequency of 3 MHz and at a magnetic flux density of 10 mT, are at most 150 mW/cm$^3$.

10. An illumination unit as claimed in claim 3, characterized in that the ferrite material of the core comprises 42.8–55.9 mole % $Fe_2O_3$, 17.6–45.7 mole % NiO and 8.4–34.3 mole % ZnO.

11. An illumination unit as claimed in claim 10, characterized in that the ferrite material of the core comprises 42.8–51.9 mole % $Fe_2O_3$, 19.2–45.7 mole % NiO and 9.6–34.3 mole % ZnO.

12. An illumination unit as claimed in claim 11, characterized in that the average width of the non-magnetic grain boundary region in the ferrite material is smaller than 4 nm.

13. An illumination unit as claimed in claim 2, characterized in that the ferrite material of the core comprises 42.8–55.9 mole % $Fe_2O_3$ 17.6–45.7 mole % NiO and 8.4–34.3 mole % ZnO.

14. An illumination unit as claimed in claim 13, characterized in that the ferrite material of the core comprises 42.8–51.9 mole % $Fe_2O_3$, 19.2–45.7 mole % NiO and 9.6–34.3 mole % ZnO.

15. An illumination unit as claimed in claim 14, characterized in that the average width of the non-magnetic grain boundary region in the ferrite material is smaller than 4 nm.

16. An illumination unit as claimed in claim 2, characterized in that the average width of the non-magnetic grain boundary region in the ferrite material is smaller than 4 nm.

17. An illumination unit as claimed in claim 6, characterized in that the ferrite material of the core comprises 42.8–50.0 mole % $Fe_2O_3$, 20.0–45.7 mole % NiO and 10.0–34.3 mole % ZnO.

18. An illumination unit as claimed in claim 9, characterized in that the core comprises Ni—Zn ferrite material.

19. An illumination unit as claimed in claim 18, characterized in that the average grain size of the ferrite material is at most 2.8 μm.

20. An illumination unit as claimed in claim 6, characterized in that the average width of the non-magnetic grain boundary region in the ferrite material is smaller than 4 nm.

21. An illumination unit as claimed in claim 20, characterized in that the ferrite material of the core comprises 42.8–50.0 mole % $Fe_2O_3$, 20.0–45.7 mole % NiO and 10.0–34.3 mole % ZnO.

22. An illumination unit as claimed in claim 18, characterized in that the ferrite material of the core comprises 42.8–55.9 mole % $Fe_2O_3$, 17.6–45.7 mole % NiO and 8.4–34.3 mole % ZnO.

23. An illumination unit as claimed in claim 18, characterized in that the average width of the non-magnetic grain boundary region in the ferrite material is smaller than 4 nm.

24. An electrodeless low-pressure mercury discharge lamp exhibiting reduced loading of an associated high frequency supply device during starting, said lamp comprising:

a discharge vessel enclosing a discharge space in a gas-tight manner;

a discharge-sustaining filling within said discharge space; and a coil for inducing a high frequency magnetic field which maintains a discharge in said discharge-sustaining filling within said discharge space, said coil including a core and a winding around said core, said core comprising a Ni—Zn ferrite material with a granular structure in which the major portion of the grains has a monodomain structure, said ferrite material having non-magnetic grain boundary regions with an average width smaller than 4 nm, and the losses in said core, when measured at room temperature in an alternating magnetic field with a frequency of 3 MHz and at a magnetic flux density of 10 mT, are at most 150 mW/cm$^3$.

25. A core for an electrodeless low-pressure mercury vapor discharge lamp, comprising:

a Ni—Zn ferrite material with a granular structure in which the major portion of the grains has a monodomain structure, said ferrite material having non-magnetic grain boundary regions with an average width smaller than 4 nm, and the losses in said core, when measured at room temperature in an alternating magnetic field with a frequency of 3 MHz and at a magnetic flux density of 10 mT, are at most 150 mW/cm$^3$.

* * * * *